(12) United States Patent
Parkman et al.

(10) Patent No.: US 11,788,433 B2
(45) Date of Patent: Oct. 17, 2023

(54) LUBRICATION SYSTEM OF AIRCRAFT ENGINE

(71) Applicant: PRATT & WHITNEY CANADA CORP., Longueuil (CA)

(72) Inventors: Kenneth Parkman, Halton Hills (CA); Daniel Alecu, Brampton (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 0 days.

(21) Appl. No.: 17/510,804

(22) Filed: Oct. 26, 2021

(65) Prior Publication Data

US 2023/0130641 A1  Apr. 27, 2023

(51) Int. Cl.
 *F01D 25/20* (2006.01)
 *F01M 1/02* (2006.01)

(52) U.S. Cl.
 CPC .............. *F01D 25/20* (2013.01); *F01M 1/02* (2013.01); *F01M 2001/0238* (2013.01); *F01M 2250/60* (2013.01)

(58) Field of Classification Search
 CPC .. F01D 25/20; F01M 1/02; F01M 2001/0238; F01M 2250/60
 See application file for complete search history.

(56) References Cited

U.S. PATENT DOCUMENTS

| | | | |
|---|---|---|---|
| 6,758,598 B2 * | 7/2004 | Beauvais | F16C 33/6674 184/5 |
| 6,996,968 B2 | 2/2006 | Peters et al. | |
| 7,811,001 B2 | 10/2010 | Swainson | |
| 8,337,090 B2 * | 12/2012 | Herborth | F16C 27/045 384/582 |
| 8,511,057 B2 | 8/2013 | Fomison et al. | |
| 2005/0132710 A1 * | 6/2005 | Peters | F01D 25/18 60/772 |

(Continued)

FOREIGN PATENT DOCUMENTS

| | | |
|---|---|---|
| EP | 1544417 A2 | 6/2005 |
| EP | 3176379 A1 | 6/2017 |
| FR | 3104193 A1 | 6/2021 |

OTHER PUBLICATIONS

European Patent Office, Communication re. extended European search report for European patent application No. 22203644.4 dated Mar. 13, 2023.

*Primary Examiner* — Grant Moubry
*Assistant Examiner* — Ruben Picon-Feliciano
(74) *Attorney, Agent, or Firm* — Norton Rose Fulbright Canada LLP

(57) ABSTRACT

Lubrication systems of an aircraft engine and associated methods are provided. The lubrication system includes a chamber having a fluid inlet for receiving lubricating fluid into the chamber, and a fluid outlet for draining the lubricating fluid from the chamber. The fluid outlet is disposed on a wall defining part of the chamber. A rotor is disposed inside the chamber and interacts with the lubricating fluid inside the chamber. The rotor is rotatable in a rotation direction about a rotation axis. A perforated baffle is disposed in the chamber for interacting with the lubricating fluid inside the chamber. The perforated baffle includes a base attached to the wall of the chamber. The base of the perforated baffle is disposed at an angular position preceding the fluid outlet relative to the rotation direction of the rotor.

18 Claims, 7 Drawing Sheets

(56) References Cited

U.S. PATENT DOCUMENTS

| | | | |
|---|---|---|---|
| 2016/0131034 A1* | 5/2016 | Chilton | .................... F16N 7/16 184/6.11 |
| 2021/0115851 A1 | 4/2021 | Dick | |

* cited by examiner

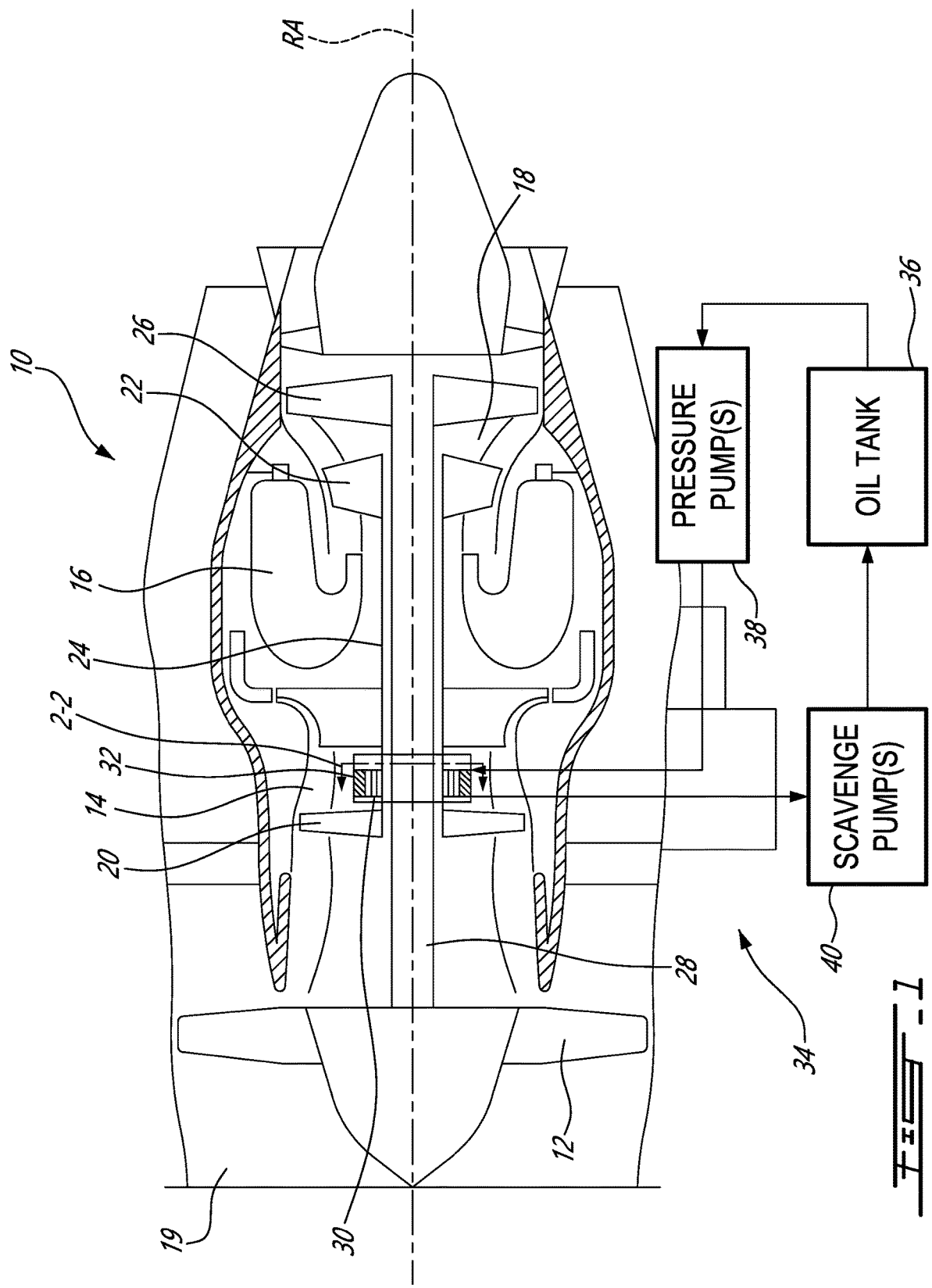

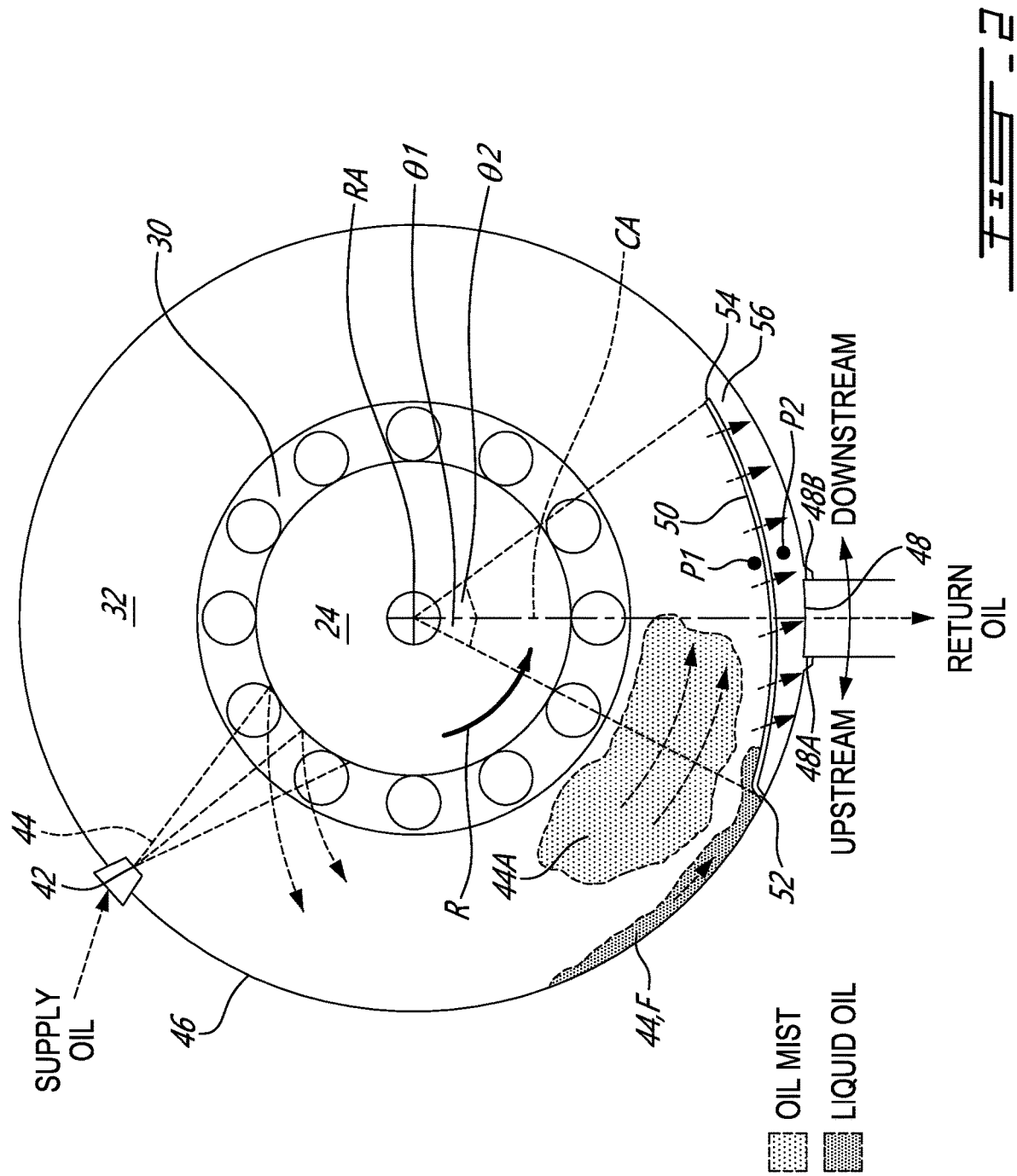

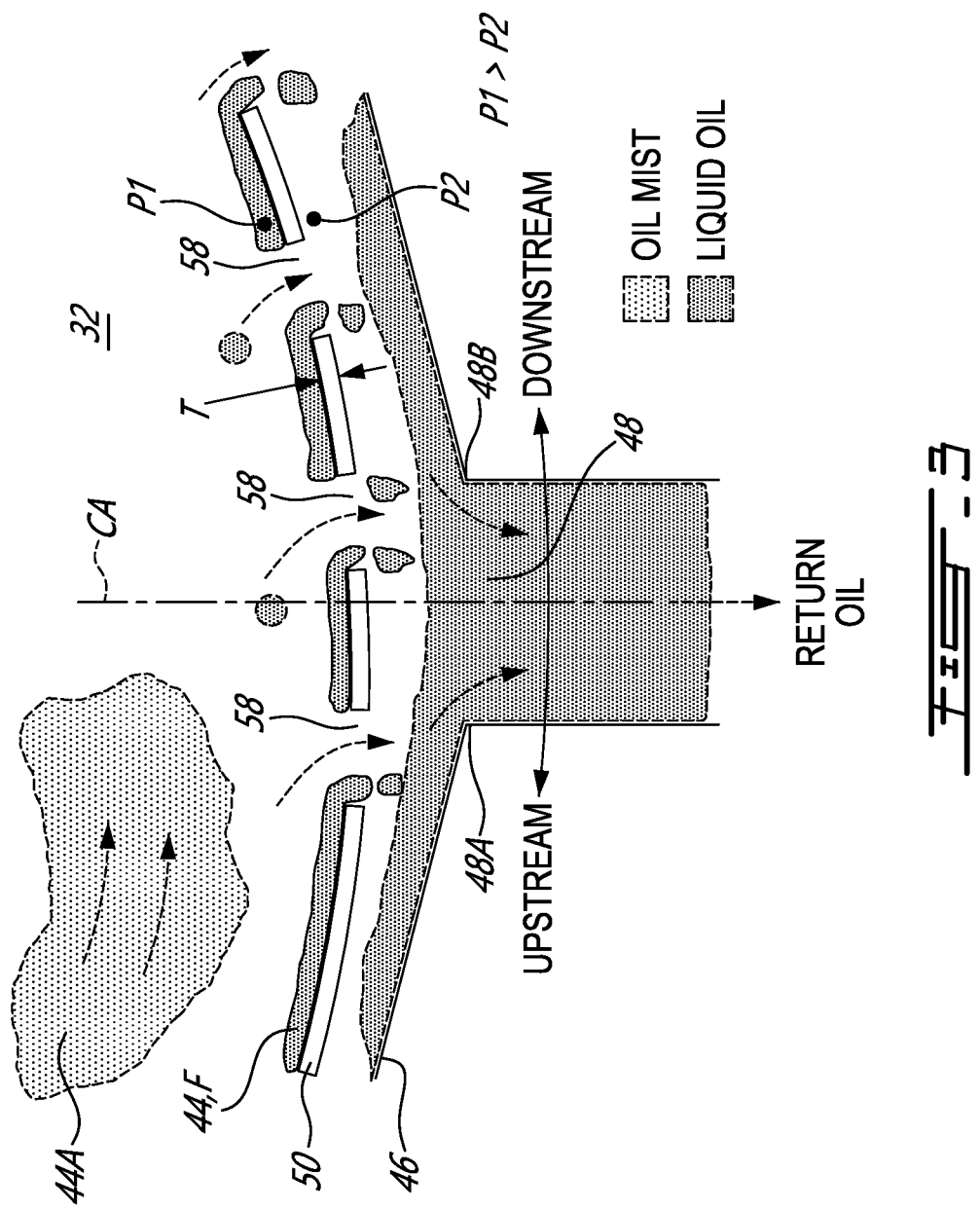

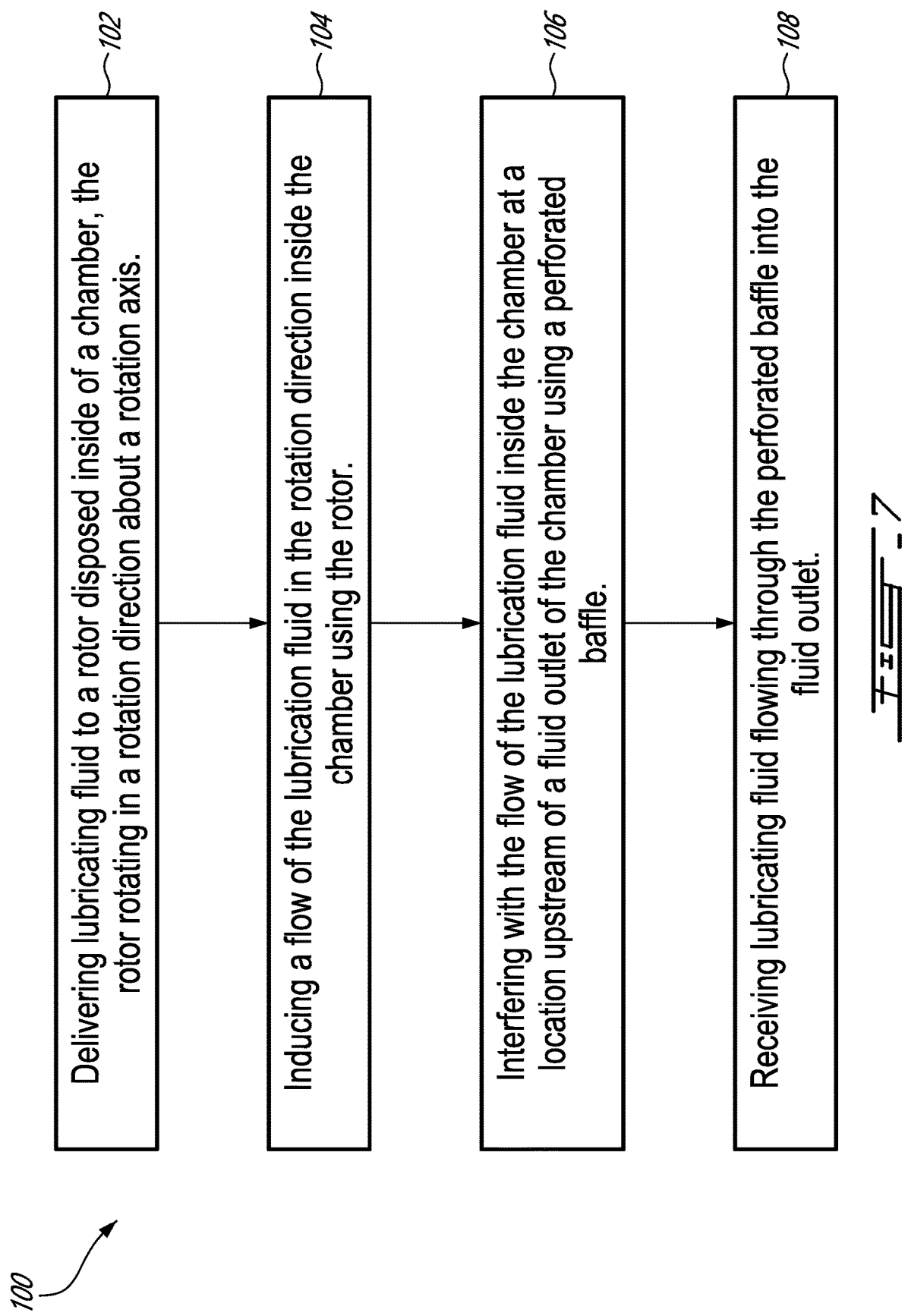

LUBRICATION SYSTEM OF AIRCRAFT ENGINE

TECHNICAL FIELD

The disclosure relates generally to aircraft engines, and more particularly to lubricating components of aircraft engines.

BACKGROUND

Gas turbine engines have rotors that are rotatably supported by bearings. The bearings are supplied with oil which is recycled by scavenging it from the bearing chambers (sometimes called "bearing cavities"), and returning the oil to the bearings after processing (e.g., cooling, filtering, conducting air-oil separation). In a gas turbine application, a rotor interacting with the oil can rotate at thousands of revolutions per minute (RPM). The rotation of the rotor can cause misting of the oil inside of the bearing chamber, which in turn can reduce the effectiveness of the oil in some situations.

SUMMARY

In one aspect, the disclosure describes a lubrication system of an aircraft engine. The lubrication system comprises:
  a chamber having a fluid inlet for receiving lubricating fluid into the chamber, and a fluid outlet for draining the lubricating fluid from the chamber, the fluid outlet being disposed on a wall defining part of the chamber;
  a rotor disposed inside the chamber and interacting with the lubricating fluid inside the chamber, the rotor being rotatable in a rotation direction about a rotation axis during operation of the aircraft engine; and
  a perforated baffle disposed in the chamber, the perforated baffle including a base attached to the wall of the chamber, the perforated baffle extending from the base into the chamber to interact with the lubricating fluid inside the chamber, the perforated baffle being at least partially axially coincident with the fluid outlet relative to the rotation axis of the rotor, the base of the perforated baffle being disposed at an angular position relative to the rotation axis of the rotor, the angular position of the base preceding the fluid outlet relative to the rotation direction of the rotor.

In another aspect, the disclosure describes an aircraft engine comprising:
  a shaft rotatable in a rotation direction about a rotation axis during operation of the aircraft engine;
  a bearing chamber housing a bearing rotatably supporting the shaft, the bearing chamber having an oil inlet for receiving oil into the bearing chamber, the bearing chamber having an oil outlet for scavenging the oil from the bearing chamber, the oil outlet being disposed on a wall of the bearing chamber, the oil outlet having an upstream side at a first angular position relative to the rotation axis of the shaft, the oil outlet having a downstream side at a second angular position relative to the rotation axis of the shaft, the first angular position preceding the second angular position relative to the rotation direction of the shaft; and
  a perforated baffle disposed inside the bearing chamber, the perforated baffle including a base attached to the wall of the bearing chamber, the perforated baffle extending from the base into the bearing chamber to interact with the oil inside the bearing chamber, the perforated baffle being at least partially axially coincident with the oil outlet relative to the rotation axis of the rotor, the base of the perforated baffle being disposed closer to the upstream side of the oil outlet than to the downstream side of the oil outlet.

In a further aspect, the disclosure describes a method of lubricating a lubrication load in an aircraft engine. The method comprises:
  delivering lubricating fluid to a rotor disposed inside of a chamber, the rotor rotating in a rotation direction about a rotation axis;
  inducing a flow of the lubrication fluid in the rotation direction inside of the chamber using the rotor;
  interfering with the flow of the lubrication fluid inside of the chamber at a location upstream of a fluid outlet defined in a wall of the chamber using a perforated baffle, the perforated baffle having an upstream side facing toward the flow of the lubricating fluid and a downstream side facing toward the fluid outlet; and
  receiving lubricating fluid flowing through the perforated baffle into the fluid outlet.

Further details of these and other aspects of the subject matter of this application will be apparent from the detailed description included below and the drawings.

DESCRIPTION OF THE DRAWINGS

Reference is now made to the accompanying drawings, in which:

FIG. 1 shows a schematic axial cross-section view of a turbo-fan gas turbine engine including a lubrication system as described herein;

FIG. 2 is schematic cross-sectional view of an exemplary lubrication load of the lubrication system of FIG. 1 taken along line 2-2 in FIG. 1;

FIG. 3 is an enlarged view of part of the lubrication load of FIG. 2 including an oil outlet;

FIG. 7 is a flowchart of a method of lubricating a lubrication load in an aircraft engine.

DETAILED DESCRIPTION

Figure 4B:
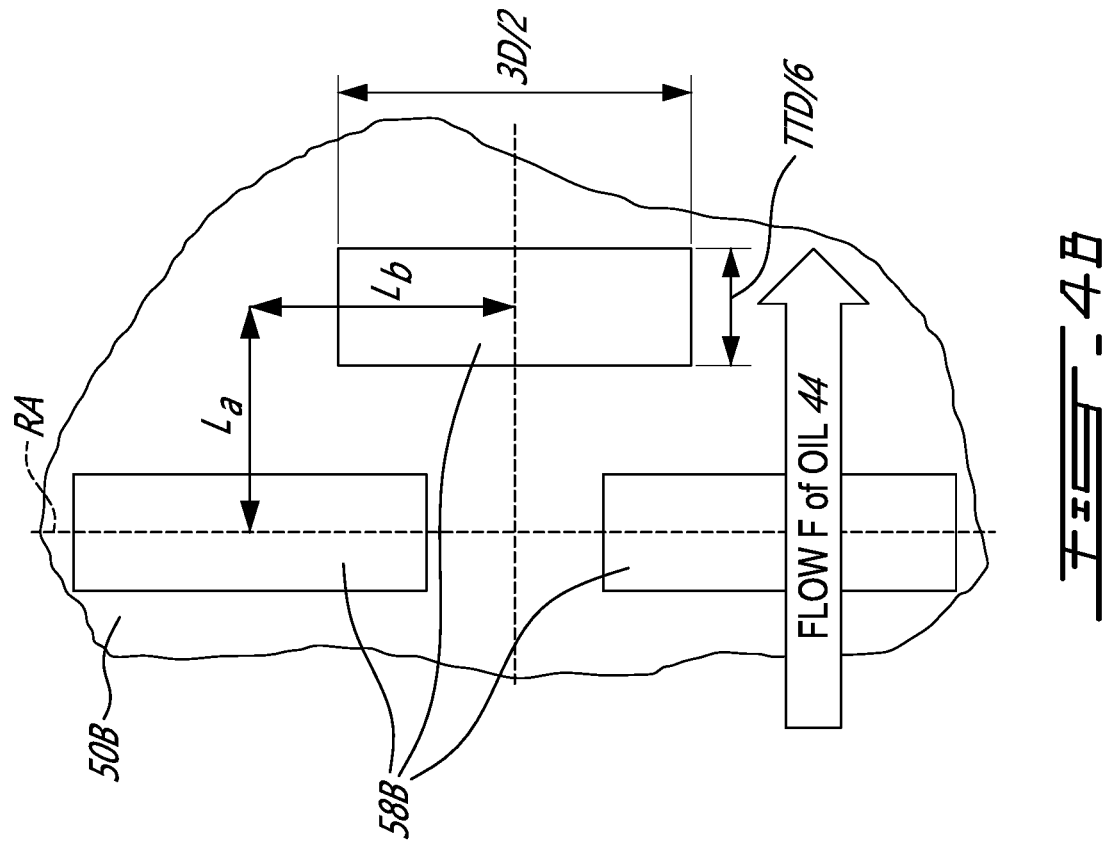
FIGS. 4A and 4B are top plan views of exemplary perforated baffles of the lubrication load of FIG. 2.

The present disclosure describes lubrication systems of aircraft engines, and associated methods. In some embodiments, the lubrication systems and methods described herein may promote an improved effectiveness of lubrication fluid in some situations. For example, in a bearing chamber where a shaft rotating at relatively high speed is interacting with oil, a relatively fine oil mist may be produced inside the bearing chamber. The oil mist may not be as effectively entrained by centrifugal acceleration or a pressure differential compared to oil in the liquid phase. Accordingly, the oil mist being produced inside of the bearing chamber may be more difficult to evacuate from the bearing chamber. If the oil mist is being produced at a rate higher than a rate at which it is being evacuated from the bearing chamber, this may reduce the (e.g., heat rejection, lubricating) effectiveness of the oil and may be generally undesirable. In some embodiments, the lubrication systems and methods described herein may promote the evacuation of the oil mist from such bearing chambers or from other lubrication loads to improve the effectiveness of the oil.

U.S. Patent Publication No. 2021/0115851 (title: BEARING CAVITY AND METHOD OF EVACUATING OIL THEREFROM) discloses other methods and devices to facilitate oil evacuation from bearing cavities, and is incorporated herein by reference.

The term "connected" may include both direct connection (in which two elements that are coupled to each other contact each other) and indirect connection (in which at least one additional element is located between the two elements).

The term "substantially" as used herein may be applied to modify any quantitative representation which could permissibly vary without resulting in a change in the basic function to which it is related.

Aspects of various embodiments are described through reference to the drawings.

FIG. 1 illustrates an aircraft engine 10 (referred hereinafter as "engine 10") depicted as a turbofan gas turbine engine of a type preferably provided for use in subsonic flight, generally comprising, in serial flow communication, fan 12 through which ambient air is propelled, compressor section 14 for pressurizing the air, combustor 16 in which the compressed air is mixed with fuel and ignited for generating an annular stream of hot combustion gases, and turbine section 18 for extracting energy from the combustion gases.

Engine 10 may have air intake 19 for receiving ambient air therein. Compressor section 14 may have compressor stage 20 disposed in a core gas path of engine 10, and turbine section 18 may have high-pressure (HP) turbine 22 disposed in the core gas path of engine 10 as well. Compressor stage 20 and HP turbine 22 may be drivingly connected together for common rotation via HP shaft 24 so that compressor stage 20, HP turbine 22, and HP shaft 24 may define a HP spool of engine 10. Turbine section 18 may have low-pressure (LP) turbine 26 disposed in the core gas path of engine 10. Fan 12 and LP turbine 26 may be drivingly connected together for common rotation via LP shaft 28 so that fan 12, LP turbine 26, and LP shaft 28 may define a LP spool of engine 10. In some embodiments, HP shaft 24 and LP shaft 28 may be coaxial so that LP shaft 28 may extend through HP shaft 24. HP shaft 24 and LP shaft 28 may be separately rotatable about rotation axis RA, which may be a center line of engine 10.

HP shaft 24 (or LP shaft 28 or other shaft) may be rotatably supported within the engine 10 by bearing 30 and by one or more other bearings (not shown). Bearing 30 may be disposed inside of bearing chamber 32 and may be operatively disposed between HP shaft 24 and suitable support structure of engine 10. Lubrication system 34 may be provided for supplying oil from oil tank 36 to bearing 30. Lubrication system 34 may include one or more pressure pumps 38 for driving oil from oil tank 36 to bearing 30. Lubrication system 34 may include one or more scavenge pumps 40 for evacuating the oil from bearing chamber 32 and returning the oil to oil tank 36 for eventual reuse.

Lubrication system 34 may service one or more lubrication loads in addition to bearing 30. Aspects of the present disclosure may be used to lubricate other types of lubrication loads that include rotors (e.g., shafts, gears) that may interact with oil or other fluid(s). For example, aspects of the present disclosure may be used to lubricate and cool one or more gears in a gearbox. Even though oil is referenced herein as a lubricating fluid, it is understood that some lubrication loads and methods described herein may be suitable for use with another fluid such as fuel or a liquid coolant fluid for example. It is also understood that the lubrication loads and methods described herein may be used on other types of aircraft engines such as internal combustion (e.g., piston, rotary) engines, and various types of (e.g., turbofan, turboshaft, turboprop) gas turbine engines that may be used to propel an aircraft, or that may be used as auxiliary power unit(s).

FIG. 2 is schematic cross-sectional view of bearing chamber 32 as an exemplary lubrication load taken along line 2-2 in FIG. 1. Bearing chamber 32 may have HP shaft 24 disposed therein. In some embodiments, HP shaft 24 may extend through bearing chamber 32. HP shaft 24 may be rotatable about rotation axis RA and may be rototable in rotation direction R during operation of engine 10. As explained below, aspects of bearing chamber 32 may be defined based on rotation direction R in order to promote a desired evacuation of oil from bearing chamber 32.

Bearing chamber 32 may house bearing 30 rotatably supporting HP shaft 24. However, aspects of the present disclosure are also applicable to bearing chambers supporting LP shaft 28 or other shafts/rotors. Bearing chamber 32 may have one or more oil inlets 42 (referred hereinafter in the singular) for receiving oil 44 into bearing chamber 32. Oil inlet 42 may be disposed to permit oil 44 to be delivered to bearing 30 and/or to HP shaft 24 in the vicinity of bearing 30. Accordingly, oil 44 entering bearing chamber 32 may impinge on rotating HP shaft 24 or otherwise interact with HP shaft 24. The interaction of oil 44 with rotating HP shaft 24 may cause some of oil 44 to be flung outwardly from HP shaft 24 toward an inner surface of bearing chamber 32 defined by wall 46 of bearing chamber 32. Wall 46 may have a substantially circular transverse cross-sectional profile as shown in FIG. 2 but wall 46 may have a non-circular cross-sectional profile in some embodiments. The interaction of oil 44 with rotating HP shaft 24 may also cause some of oil 44 to be reduced to relatively fine particles (atomization) so that oil mist 44A may be generated inside of bearing chamber 32.

The potential for the generation of oil mist 44A inside of bearing chamber 32 may be higher at higher rotational shaft speeds (e.g., between 20,000 and 35,000 RPM for example). The rotation of HP shaft 24 and the frictional engagement (windage) between HP shaft 24 and oil 44 (and also with oil mist 44A and air) inside of bearing chamber 32 may induce oil 44 and oil mist 44A inside of bearing chamber 32 to flow in the same rotation direction R. In other words, the rotation of HP shaft 24 may induce a swirling movement of oil 44 and of oil mist 44A inside of bearing chamber 32 as shown in FIG. 2. Larger particles of oil 44 may collect on wall 46 due to the centrifugal force acting on such particles caused by the induced rotation of oil 44 and oil mist 44A. As shown in FIG. 2, flow F of oil 44 may be induced by HP shaft 24 in the same rotation direction R (e.g., counter-clockwise as shown in FIG. 2) along wall 46 of bearing chamber 32.

As described herein, elements of bearing chamber 32 may be defined and located in reference to rotation axis RA of HP shaft 24, and also in reference to rotation direction R serving as a reference direction. For example, elements of bearing chamber 32 may located by way of angular positioning around rotation axis RA. References to "upstream" and "downstream" are also made herein in relation to rotation direction R in which HP shaft 24 is rotating, and in which rotation of oil 44 and oil mist 44A is induced due to windage.

Bearing chamber 32 may have one or more oil outlets 48 (referred hereinafter in the singular) for evacuating and scavenging oil 44 from bearing chamber 32, and returning oil 44 to oil tank 36 shown in FIG. 1 for example. Oil outlet 48 may be disposed on wall 46 of bearing chamber 32. Oil outlet 48 may be disposed on a lower portion (e.g., at the bottom) of wall 46 relative to a vertical orientation to promote draining of bearing chamber 32 of oil 44. Oil outlet 48 may have upstream side 48A at a first angular position relative to rotation axis RA of HP shaft 24. Oil outlet 48 may also have downstream side 48B at a second angular position relative to rotation axis RA of HP shaft 24. The first angular position of upstream side 48A may precede (i.e., be upstream of) the second angular position of downstream side 48B relative to rotation direction R of HP shaft 24.

Bearing chamber 32 may also include one or more perforated baffles 50 (referred hereinafter in the singular as "baffle 50") disposed inside bearing chamber 32. Perforated baffle 50 may include base 52 attached (e.g., welded, fastened) to wall 46 of bearing chamber 32. Baffle 50 may extend from base 52 into bearing chamber 32 to interact with oil 44 and oil mist 44A inside bearing chamber 32. Baffle 50 may also have distal end 54 that is opposite (distal) of base 52. Distal end 54 of baffle 50 may be a free end having one or more portions thereof that are unsupported by wall 46 of bearing chamber 32.

FIG. 2 shows a cross-sectional profile of baffle 50 which may extend axially along rotation axis RA (i.e., perpendicular to the page). In some embodiment, baffle 50 may have an axial span along rotation axis RA that at least partially overlaps with an axial span of oil outlet 48. In some embodiments, baffle 50 may have an axial span along rotation axis RA that entirely covers the axial span of oil outlet 48. In other words, baffle 50 may be at least partially axially coincident with oil outlet 48 relative to rotation axis RA of HP shaft 24.

Base 52 of baffle 50 may be disposed at an angular position that precedes (i.e., is upstream of) an angular position of oil outlet 48 relative to rotation direction R of HP shaft 24. In other words, base 52 of baffle 50 may be disposed closer to upstream side 48A of oil outlet 48 than to downstream side 48B of oil outlet 48. In reference to central axis CA of oil outlet 48, base 52 may be disposed at an angle θ1 from central CA about rotation axis RA and in the upstream direction. In some embodiments, angle θ1 may be less than 180 degrees. In some embodiments, angle θ1 may be 90 degrees or less. In some embodiments, angle θ1 may be between 15 degrees and 45 degrees. In some embodiments, base 52 of baffle 50 may be adjoining upstream side 48A of oil outlet 48.

In some embodiments of baffle 50, distal end 54 of baffle 50 may be disposed at an angular position that succeeds (i.e., is downstream of) the angular position of oil outlet 48 relative to rotation direction R of HP shaft 24. In other words, distal end 54 of baffle 50 may be disposed closer to downstream side 48B of oil outlet 48 than to upstream side 48A of oil outlet 48. In reference to central axis CA of oil outlet 48, base 52 may be disposed at an angle θ2 from central CA about rotation axis RA and in the downstream direction. In some embodiments, angle θ2 may be less than 180 degrees. In some embodiments, angle θ2 may be 90 degrees or less. In some embodiments, angle θ2 may be between 15 degrees and 45 degrees.

The extent to which baffle 50 extends circumferentially upstream or downstream of oil outlet 48 may differ in different applications. The shape of baffle 50 may also differ in different applications. The specific shape and positioning may be optimized based on empirical data or simulation using computational fluid dynamics for example. The specific shape and positioning may also be selected based on cost and/or installation factors. For example, instead of having a curved portion near base 52 for interfacing with wall 46 at a perpendicular orientation to wall 46, baffle 50 may have different shapes that provide different aerodynamic effects on flow F of oil 44 and provide a more or less prominent obstruction to flow F of oil 44 upstream of oil outlet 48. Base 52 may also be referred to as a leading edge of baffle 50, and distal end 54 may also be referred to as a trailing edge of baffle 50. In some embodiments, baffle 50 may have an angular span (sector) of between 30 and 90 degrees. In some embodiments, baffle 50 may have an angular span (sector) of between 35 and 50 degrees.

Baffle 50 may have the form of a perforated sheet or plate extending from base 52 to distal end 54. Baffle 50 may be curved or planar. Baffle 50 may be made of sheet metal machined and formed to the desired shape. Base 52 may be welded or otherwise fastened to wall 46 to the upstream side of oil outlet 48. The perforated portion of baffle 50 may be spaced apart from the portion of wall 46 along which baffle 50 extends while remaining generally in a lower and radially-outer portion of bearing chamber 32. The relative position between baffle 50 and portion of wall 46 surrounding oil outlet 48 may differ for different applications. For example, such distance may be selected as a function of the operating conditions inside of bearing chamber 32 and an expected amount of oil 44 to be scavenged from bearing chamber 32 per unit of time.

Baffle 50 may extend radially inwardly from wall 46 of bearing chamber 32. In some embodiments, baffle 50 also extend laterally inside of bearing chamber 32. For example, baffle 50 may extend into a radial space between oil outlet 48 and rotation axis RA of HP shaft 24. For example, when viewed along central axis CA of oil outlet 48, baffle 50 may cover none, some or an entirety of oil outlet 48 in various embodiments of baffle 50. In other words, baffle 50 may extend over oil outlet 48. In some embodiments, oil outlet 48 may be disposed at a lowermost location within bearing chamber 32 in order to promote more complete draining of bearing chamber 32 following the operation of engine 10. However, it is understood that oil outlet 48 may not necessarily be disposed at the lowermost location. In some embodiments, central axis CA of oil outlet 48 may intersect rotation axis RA of HP shaft 24 but it is understood that central axis CA of oil outlet 48 may not necessarily intersect rotation axis RA.

In some embodiments, base 52 of baffle 50, and the interface between base 52 and wall 46 may define a continuous fluid barrier extending along an axial span along rotation axis RA that axially covers some or an entire axial span of oil outlet 48 relative to rotation axis RA of HP shaft 24. Baffle 50 may define a blunt ended aerodynamic body that introduces a relatively small perturbation to the main flow of oil 44 and oil mist 44A inside of bearing chamber 32. Baffle 50 may have an upstream side facing toward flow F of oil 44 and a downstream side facing toward oil outlet 48. For example, base 52 may interfere with (obstruct) flow F of oil 44 flowing along the wall 46 at a location upstream of oil outlet 48. As flow F of oil 44 comes to base 52 of baffle 50, flow F of oil 44 may then climb onto base 52 and flow onto baffle 50. The centrifugal force acting on oil 44 and on oil mist 44A may also cause oil 44 to flow along baffle 50 and also be radially outwardly biased against baffle 50. Distal end 54 of baffle 50 may be spaced apart from wall 46 defining bearing chamber 32. For example, distal end 54 and wall 46 of bearing chamber 32 may define fluid passage 56 therebetween.

During operation when lubrication of bearing chamber 32 and rotation of HP shaft 24 are taking place, pressure P1 exerted by oil 44 on a side of baffle 50 opposite oil outlet 48 may be higher than pressure P2 on an opposite side of baffle 50 facing oil outlet 48. Perforations 58 (shown in FIG. 3) formed through baffle 50 may cause baffle 50 to function as a pluvial drain grate allowing oil 44 to drain through baffle 50 and into the relatively quiet (i.e., lower pressure) zone under baffle 50. Oil 44 flowing through baffle 50 may then flow toward oil outlet 48 and be scavenged from bearing chamber 32. Excess air that may also pass through baffle 50 via perforations 58 may be allowed to escape the quiet zone downstream of oil outlet 48 via fluid passage 56 at relatively low velocity thus causing relatively low entrainment on oil 44 inside of bearing chamber 32.

The presence of baffle 50 may promote some separation of oil 44 from the air inside of bearing chamber 32. Also, in case of oil bubbling and foam generation caused by the flow F of oil 44 through perforations 58 of baffle 50, such bubbles/foam would develop on the quiet side of baffle 50 and be shielded from the main swirling flow of oil 44 and oil mist 44A inside of bearing chamber 32 in order to discourage the further release of oil particles causing further atomization (misting) of oil 44. Scavenge pump 40 may assist in maintaining pressure P2 that is lower than pressure P1 to promote oil drainage and foam removal from the relatively quiet side of baffle 50 facing oil outlet 48.

FIG. 3 is an enlarged schematic cross-section view of a lower part of bearing chamber 32 shown in FIG. 2 in the vicinity of oil outlet 48. FIG. 3 schematically shows perforations 58 formed through baffle 50. Perforations 58 may be formed through baffle 50 by (mechanical or laser) drilling for example. Alternatively, perforations 58 may be formed by hole punching for example. During operation of bearing chamber 32, oil 44 may flow through baffle 50 via perforations 58 and flow toward oil outlet 48. Pressure P1 on the side of baffle 50 exposed to the main flow of oil 44 and oil mist 44A may be higher than pressure P2 on the opposite side of baffle 50 facing oil outlet 48 so that P1>P2, and oil 44 may be driven to flow through baffle 50 toward oil outlet 48. In some embodiments, baffle 50 may have a substantially uniform thickness T of between 0.025" (0.6 mm) and 0.050" (1.3 mm), or may have a non-uniform thickness T.

Figure 4A:
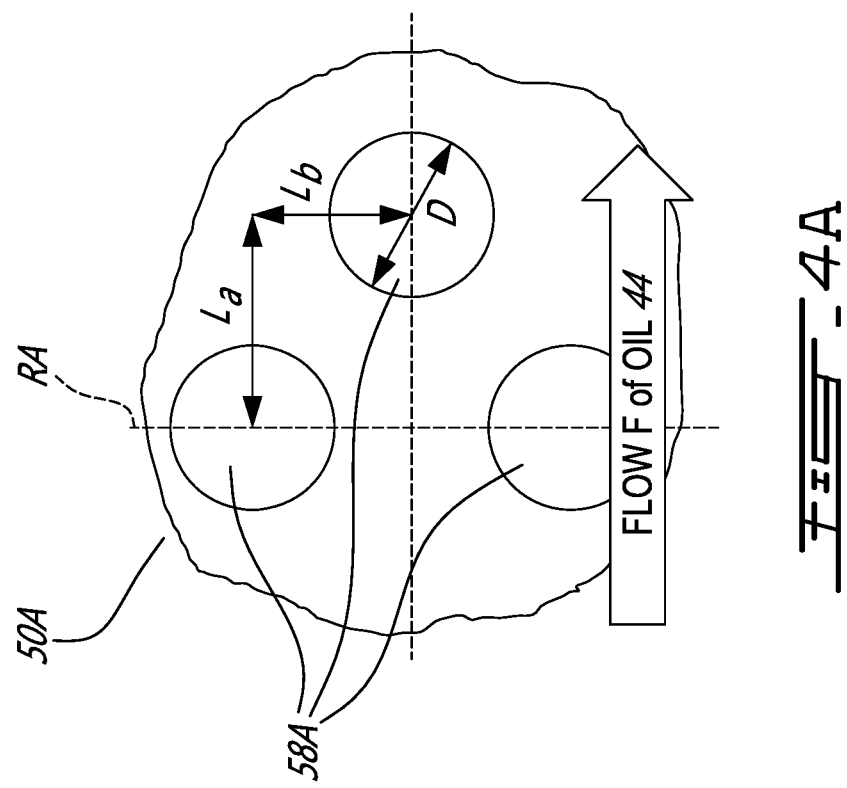

FIGS. 4A and 4B are top plan views of portions of exemplary baffles 50A, 50B of bearing chamber 32. As shown in FIGS. 4A, 4B, perforations 58A, 58B may be circular, rectangular or of some other shape(s). In some embodiments, perforations 58A, 58B may be configured into a staggered array where each axially-extending column of perforations 58A, 58B is axially offset relative to the adjacent axially-extending column of perforations 58A, 58B as shown in FIGS. 4A, 4B. Such staggered arrangement of perforations 58A, 58B may allow perforations 58A, 58B to be present all along an axial length of baffle 50 so that intervening spaces disposed axially between axially adjacent perforations 58A, 58B may not bridge flow F of oil 44 laterally across an entirety of baffle 50. In other words, flow F of oil 44 passing between two adjacent perforations 58A, 58B in one column of perforations 58A, 58B will encounter a perforation 58A, 58B of a subsequent (e.g., the adjacent) column.

In reference to FIG. 4A, circular perforations 58A may have a diameter D of between 3/32" (2.4 mm) and 3/16" (4.8 mm) in some embodiments. The center-to-center spacing of circular perforations 58A may be about 1.5D in some embodiments. The staggering of the pattern of circular perforations 58A may be defined by dimensions La and Lb where La may be between 5D/4 and 2D, and Lb may be between 3D/4 and 5D/4 in some embodiments.

In reference to FIG. 4B, the dimensions of rectangular perforations 58B may be related to diameter D so that a width of perforations 58B may be about $\pi D/6$ and a height of perforations 58B may be about 3D/2 in some embodiments. The staggering of the pattern of rectangular perforations 58B may also be defined by dimensions La and Lb where La may be between $(\pi/6+1)D$ and 2D, and Lb may be between 7D/4 and 9D/4 in some embodiments.

In various embodiments, the density of perforations 58A and/or perforations 58B may be selected to define a perforated area of between 40% and 60% of an area of baffle 50 containing perforations 58A and/or 58B.

Figure 5:
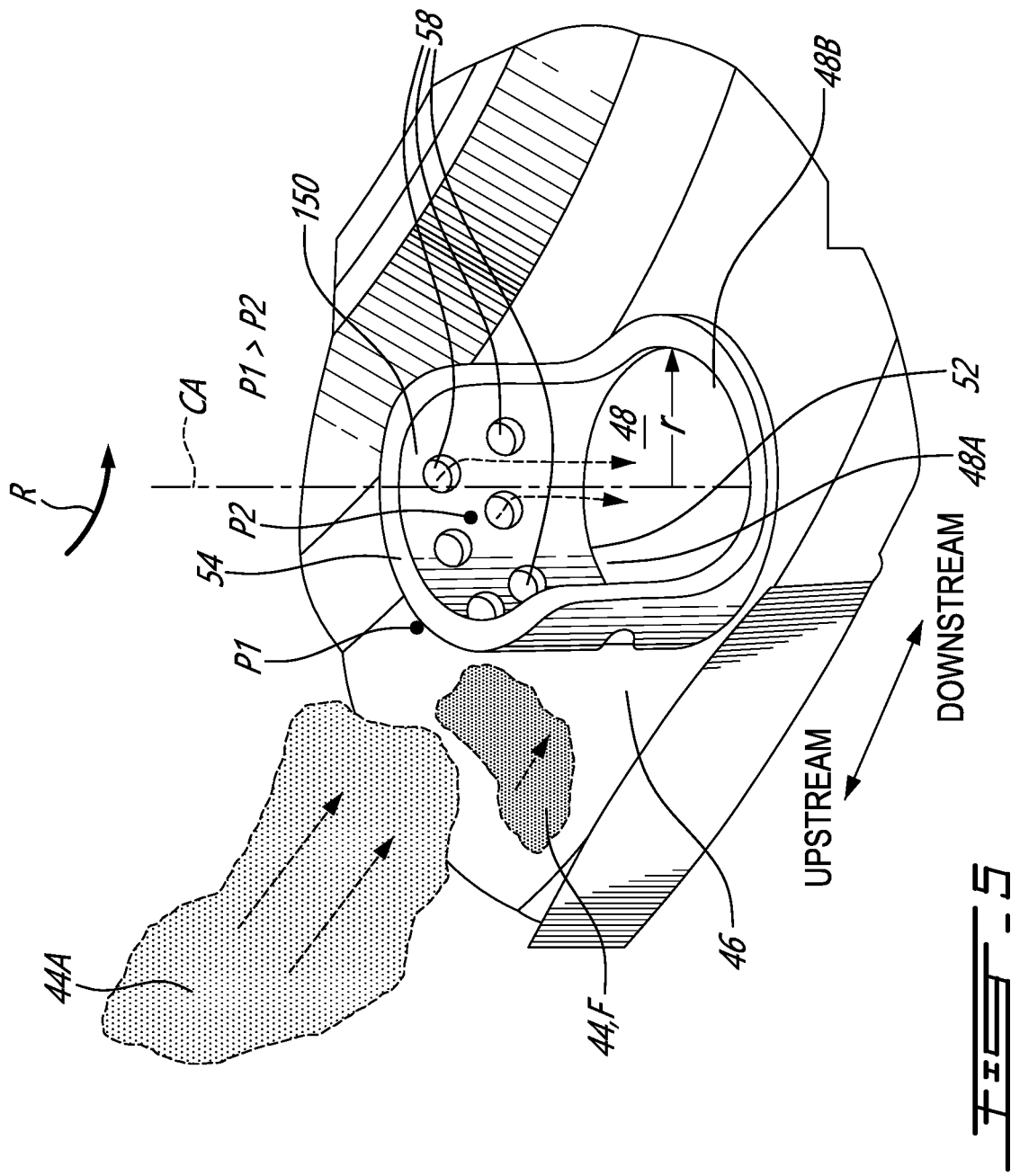
FIG. 5 is a perspective view of another exemplary baffle of the lubrication load of FIG. 2.

FIG. 5 is a perspective view of another exemplary perforated baffle 150 (referred hereinafter as "baffle 150") that may be incorporated into bearing chamber 32 of FIG. 2. The principle of operation of baffle 150 may be generally similar to that of baffle 50 explained above. Like elements are identified using like reference numerals. The configuration of baffle 150 may simplify installation of baffle 150 via a scavenge tube defining oil outlet 48. Baffle 150 may be disposed upstream of oil outlet 48 in relation to rotation direction R. Baffle 150 may be installed into bearing chamber 32 by welding or fastening.

In some embodiments, base 52 of baffle 150 may be adjoining oil outlet 48 or may be disposed upstream of oil outlet 48. Base 52 of perforated baffle 150 may be disposed closer to upstream side 48A of oil outlet 48 than to downstream side 48B of oil outlet 48. In some embodiments, baffle 50 may define an axial extension of oil outlet 48 extending into bearing chamber 32 axially relative to central axis CA of oil outlet 48. Central axis CA may be disposed centrally of and substantially normal to an opening defined by oil outlet 48.

Baffle 150 may be configured as a rearward facing curved scoop relative to rotation direction R. Baffle 150 may have an upstream convex side that precedes a downstream concave side of baffle 150 relative to rotation direction R. In some embodiments, a curvature of a surface of baffle 150 may match a curvature of an outline of oil outlet 48. For example, baffle 150 may have a partially cylindrical shape having a radius that matches (corresponds to) radius r of a circular outline of oil outlet 48 when viewed along central axis CA. In some embodiments, baffle 150 may extend radially inwardly relative to rotation axis RA of HP shaft 24. In some embodiments, baffle 150 may be substantially parallel to central axis CA of oil outlet 48. In some embodiments, baffle 150 may at least partially wrap around central axis CA of oil outlet 48.

During operation where lubrication of bearing chamber 32 and rotation of HP shaft 24 are taking place, baffle 150 may improve oil evacuation performance by taking advantage of the relatively lower pressure P2 generated behind baffle 150 and above oil outlet 48 relative to the higher pressure P1 generated in front of baffle 150 relative to the flow of oil 44 and oil mist 44A. As flow F of oil 44 and oil mist 44A come to base 52 of baffle 150, some of the oil 44 may then pass through baffle 150 via perforations 58. Distal end 54 of baffle 50 may be spaced apart from wall 46 defining bearing chamber 32. Base 52 of baffle 150, and the interface between base 52 and wall 46 may define a continuous fluid barrier. Oil 44 flowing through baffle 50 via perforations 58 may then flow toward oil outlet 48 and be scavenged from bearing chamber 32.

Figure 6:
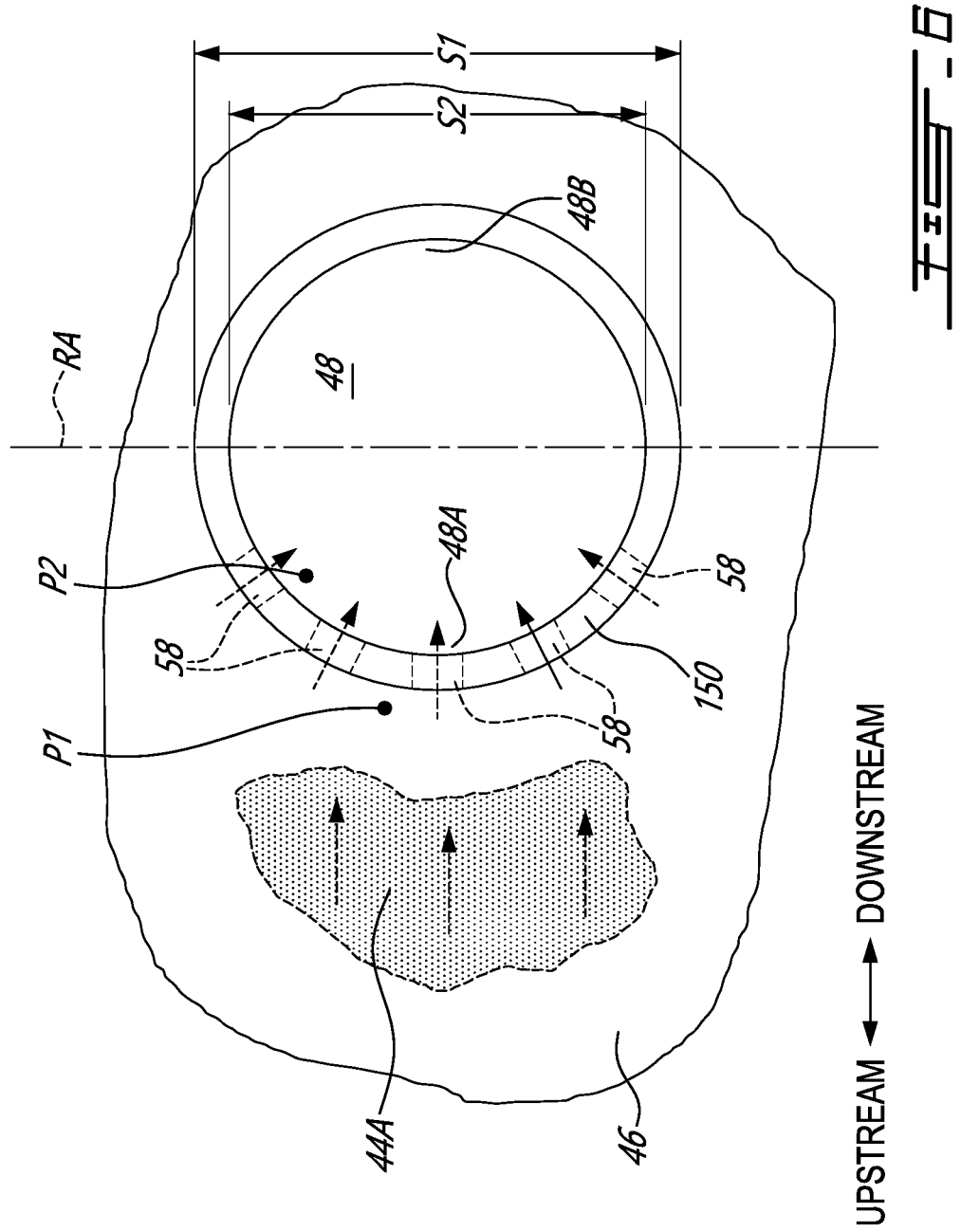
FIG. 6 is a top plan view of the baffle of FIG. 5.

FIG. 6 is a top plan view of baffle 150 of FIG. 5. Baffle 150 and base 52 of baffle 150 may extend along an axial span S1 along rotation axis RA that axially covers some or an entire axial span S2 of oil outlet 48 relative to rotation axis RA of HP shaft 24.

FIG. 7 is a flowchart of a method 100 of lubricating a lubrication load in engine 10 or other aircraft engine. Method 100 may be performed using baffle 50, baffle 150 or other baffle(s). For example, aspects of baffle 50 and/or of baffle 150 may be incorporated into method 100. In various embodiments, method 100 may include:

delivering lubricating fluid (e.g., oil 44) to a rotor (e.g., HP shaft 24 or LP shaft 28) disposed inside of a chamber (e.g., bearing chamber 32), the rotor rotating in rotation direction R about rotation axis RA (block 102);

inducing a flow of the lubrication fluid (e.g., oil 44 and/or oil mist 44A) in rotation direction R inside of the chamber using the rotor (block 104);

interfering with the flow of the lubrication fluid inside the chamber at a location upstream of a fluid outlet (e.g., oil outlet 48) defined in wall 46 of the chamber using perforated baffle 50, 150, perforated baffle 50, 150 having an upstream side facing toward the flow of the lubricating fluid and a downstream side facing toward the fluid outlet (block 106); and receiving lubricating fluid flowing through perforated baffle 50, 150 into the fluid outlet (block 108).

As shown in FIGS. 3 and 5, a pressure P1 of the lubricating fluid on the upstream side of baffle 50, 150 is greater than a pressure P2 of the lubricating fluid on the downstream side of baffle 50, 150.

The embodiments described in this document provide non-limiting examples of possible implementations of the present technology. Upon review of the present disclosure, a person of ordinary skill in the art will recognize that changes may be made to the embodiments described herein without departing from the scope of the present technology.

What is claimed is:

1. A lubrication system of an aircraft engine, the lubrication system comprising:
   a chamber having a fluid inlet for receiving lubricating fluid into the chamber, and a fluid outlet for draining the lubricating fluid from the chamber, the fluid outlet being disposed on a wall defining part of the chamber;
   a rotor disposed inside the chamber and interacting with the lubricating fluid inside the chamber, the rotor being rotatable in a rotation direction about a rotation axis during operation of the aircraft engine; and
   a perforated baffle disposed in the chamber, the perforated baffle including a base attached to the wall of the chamber, the perforated baffle extending from the base into the chamber to interact with the lubricating fluid inside the chamber, the base of the perforated baffle being at least partially axially coincident with the fluid outlet relative to the rotation axis of the rotor, the base of the perforated baffle being disposed at an angular position relative to the rotation axis of the rotor, the fluid outlet having an upstream side and a downstream side relative to the rotation direction extending past the fluid outlet, the angular position of the base preceding the fluid outlet relative to the rotation direction of the rotor so that the base of the perforated baffle is disposed closer to the upstream side of the fluid outlet than to the downstream side of the fluid outlet.

2. The lubrication system as defined in claim 1, wherein:
   the perforated baffle includes a distal end opposite the base; and
   the distal end of the perforated baffle is disposed at an angular position that succeeds the fluid outlet relative to the rotation direction of the rotor.

3. The lubrication system as defined in claim 2, wherein the distal end of the perforated baffle and the wall of the chamber define an oil passage therebetween.

4. The lubrication system as defined in claim 1, wherein the angular position of the base of the perforated baffle precedes the fluid outlet by less than 90 degrees relative to the rotation direction of the rotor.

5. The lubrication system as defined in claim 1, wherein:
   the perforated baffle includes a distal end spaced apart from the wall of the chamber; and
   the perforated baffle extends into a radial space between the fluid outlet and the rotation axis of the rotor.

6. The lubrication system as defined in claim 5, wherein the perforated baffle covers an entirety of the fluid outlet when viewed along a central axis of the fluid outlet.

7. The lubrication system as defined in claim 6, wherein the angular position of the base of the perforated baffle is between 15 degrees and 45 degrees of an angular position of the central axis of the fluid outlet relative to the rotation axis of the rotor.

8. The lubrication system as defined in claim 1, wherein the base of the perforated baffle has an axial span that axially covers an entire axial span of the fluid outlet relative to the rotation axis of the rotor.

9. The lubrication system as defined in claim 1, wherein the base of the perforated baffle defines a continuous fluid barrier extending along an axial span that axially covers an entire axial span of the fluid outlet relative to the rotation axis of the rotor.

10. The lubrication system as defined in claim 1, wherein the base of the perforated baffle is adjoining the fluid outlet.

11. The lubrication system as defined in claim 10, wherein the perforated baffle defines an axial extension of the fluid outlet.

12. The lubrication system as defined in claim 1, wherein:
    the perforated baffle has a convex side and a concave side; and
    the convex side of the perforated baffle precedes the concave side of the perforated baffle relative to the rotation direction of the rotor.

13. The lubrication system as defined in claim 1, wherein a curvature of a surface of the baffle matches a curvature of an outline of the fluid outlet.

14. An aircraft engine comprising:
    a shaft rotatable in a rotation direction about a rotation axis during operation of the aircraft engine;
    a bearing chamber housing a bearing rotatably supporting the shaft, the bearing chamber having an oil inlet for receiving oil into the bearing chamber, the bearing chamber having an oil outlet for scavenging the oil from the bearing chamber, the oil outlet being disposed on a wall of the bearing chamber, the oil outlet having an upstream side at a first angular position relative to the rotation axis of the shaft, the oil outlet having a downstream side at a second angular position relative to the rotation axis of the shaft, the first angular position of the upstream side of the oil outlet preceding the second angular position of the downstream side of the oil outlet relative to the rotation direction of the shaft extending past the oil outlet; and
    a perforated baffle disposed inside the bearing chamber, the perforated baffle including a base attached to the wall of the bearing chamber, the perforated baffle extending from the base into the bearing chamber to interact with the oil inside the bearing chamber, the base of the perforated baffle being at least partially axially coincident with the oil outlet relative to the rotation axis of the shaft, the base of the perforated baffle being disposed closer to the upstream side of the oil outlet than to the downstream side of the oil outlet.

15. The aircraft engine as defined in claim 14, wherein:
the perforated baffle includes a distal end opposite the base; and
the distal end of the perforated baffle is disposed closer to the downstream side of the oil outlet than to the upstream side of the oil outlet.

16. The aircraft engine as defined in claim 15, wherein the distal end of the perforated baffle and the wall of the of the bearing chamber define an oil passage therebetween.

17. The aircraft engine as defined in claim 14, wherein the base of the perforated baffle defines a continuous oil barrier extending along an axial span that axially covers an entire axial span of the oil outlet relative to the rotation axis of the shaft.

18. The aircraft engine as defined in claim 14, wherein the base of the perforated baffle is adjoining the oil outlet.

\* \* \* \* \*